US010452365B2

United States Patent
Nandakumar

(10) Patent No.: US 10,452,365 B2
(45) Date of Patent: *Oct. 22, 2019

(54) CO-EXISTENTIAL WRAPPING SYSTEM FOR MOBILE APPLICATIONS

(71) Applicant: CA, Inc., New York, NY (US)

(72) Inventor: Vikrant Nandakumar, Bangalore (IN)

(73) Assignee: CA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,769

(22) Filed: Oct. 19, 2017

(65) Prior Publication Data

US 2018/0060046 A1 Mar. 1, 2018

Related U.S. Application Data

(63) Continuation of application No. 14/670,604, filed on Mar. 27, 2015, now Pat. No. 9,836,286.

(51) Int. Cl.
  *G06F 8/41* (2018.01)
  *G06F 8/53* (2018.01)
  *G06F 8/76* (2018.01)

(52) U.S. Cl.
  CPC ............... *G06F 8/41* (2013.01); *G06F 8/53* (2013.01); *G06F 8/76* (2013.01)

(58) Field of Classification Search
  CPC ............... G06F 8/41; G06F 8/53; G06F 8/76
  USPC ...................................................... 717/140
  See application file for complete search history.

(56) References Cited

U.S. PATENT DOCUMENTS

| | | | | |
|---|---|---|---|---|
| 7,971,255 | B1* | 6/2011 | Kc .................... | G06F 21/566 713/164 |
| 8,584,105 | B1* | 11/2013 | Epshteyn ............ | G06F 9/45529 717/140 |
| 2001/0034846 | A1* | 10/2001 | Beery .................. | G06F 21/121 726/28 |
| 2012/0076155 | A1* | 3/2012 | Kounnas ............. | H04N 21/438 370/465 |
| 2012/0198279 | A1 | 8/2012 | Schroeder | |
| 2014/0109078 | A1 | 4/2014 | Lang et al. | |
| 2014/0181803 | A1* | 6/2014 | Cooper ................ | G06F 8/60 717/178 |

(Continued)

OTHER PUBLICATIONS

Nandakumar et al. "Appstrument—A unified App Instrumentation and automated playback framework for testing mobile applications", *Mobiguitous 2013*, Aug. 16, 2013, 12 Pages (See parent application).

(Continued)

*Primary Examiner* — Emerson C Puente
*Assistant Examiner* — Sen Thong Chen

(57) ABSTRACT

A computer program product according to some embodiments causes a processor to perform operations including disassembling executable code of an application program to provide disassembled code, identifying first wrapping code in the disassembled code, receiving second wrapping code, generating a consolidated application wrapper that manages operation of both the first wrapping code and the second wrapping code, inserting the second wrapping code and the consolidated application wrapper into the disassembled code to form modified disassembled code, and assembling the modified disassembled code to form modified executable code.

13 Claims, 9 Drawing Sheets

(56) References Cited

U.S. PATENT DOCUMENTS

2015/0199213 A1* 7/2015 Desai .................. G06F 9/468
718/102
2015/0205586 A1* 7/2015 Diamos ................ G06F 8/41
717/158

OTHER PUBLICATIONS

Pathak et al. "Where is the energy spent inside my app? Fine Grained Energy Accounting on Smartphones with Eprof", *EuroSys '12*, Apr. 10-12, 2012, Bern, Switzerland, 14 Pages (See parent application).

Ravindranath et al. "Appinsight: Mobile App Performance Monitoring in the Wild", 14 Pages, Date unknown but prior to filing the pending application on Mar. 27, 2015 (See parent application).

Sama et al. "Using Code Instrumentation to Enhance Testing on J2ME: a Lesson Learned with Jinjector", *HotMobile 2009*, Feb. 23-24, 2009, Santa Cruz, California, 7 Pages (See parent application).

Zhou et al. "Appink: Watermarking Android Apps for Repackaging Deterrence", *ASIA CCS '13*, May 8-10, 2013, Hangzhou, China, 12 Pages (See parent application).

* cited by examiner

CO-EXISTENTIAL WRAPPING SYSTEM FOR MOBILE APPLICATIONS

RELATED APPLICATION

This application is a continuation claiming the benefit under 35 U.S.C. § 120 of U.S. application Ser. No. 14/670,604, filed on Mar. 27, 2015, entitled "CO-EXISTENTIAL WRAPPING SYSTEM FOR MOBILE APPLICATIONS," the disclosure of which is incorporated by reference herein in its entirety.

FIELD

The inventive concepts described herein relate to software applications for mobile computing devices. In particular, the inventive concepts relate to the wrapping of software applications with application wrappers that monitor, test and/or manage the software applications.

BACKGROUND

Applications developed for mobile devices are distributed in an application package containing the elements needed to run the application, such as the program code, resources, certificates and a manifest.

In some cases, it is desirable for an entity such as an application designer, application tester, or enterprise administrator to exercise control over the operation of an application. For example, it may be desirable to exercise control over what features or elements of a device or operating system that the application can access, what time of day those features or elements can be accessed, what security policies are applied to the application, etc.

To accomplish this, the program code of the application may be modified to include code that performs or links to monitoring and control functions. This modification is referred to as "application wrapping." When an application is wrapped, a layer of code is added to the application binary file to add features or modify behavior of the application without making changes to the internal application code. The addition of wrapping code may reduce the risk to an enterprise of improper or unauthorized use of an application. For example, wrapping can add security and management features to an application before it is deployed to the enterprise.

SUMMARY

A computer program product according to some embodiments includes a non-transitory computer readable storage medium storing computer readable program code which when executed by a processor of an electronic device causes the processor to perform operations including disassembling executable code of an application program to provide disassembled code, identifying first wrapping code in the disassembled code, receiving second wrapping code, generating a consolidated application wrapper that manages operation of both the first wrapping code and the second wrapping code, inserting the second wrapping code and the consolidated application wrapper into the disassembled code to form modified disassembled code, and assembling the modified disassembled code to form modified executable code.

A computer program product according to further embodiments includes a non-transitory computer readable storage medium storing computer readable program code which when executed by a processor of an electronic device causes the processor to perform operations including disassembling executable code of an application program to provide disassembled code, receiving first and second wrapping code, analyzing the first and second wrapping code to identify conflicts between the first and second wrapping code, automatically generating a consolidated application wrapper that enables the first and second wrapping code to coexist without conflict in the application program, inserting the first and second wrapping code and the consolidated application wrapper into the disassembled code to form modified disassembled code, and assembling the modified disassembled code to form modified executable code.

A computing device according to some embodiments includes a processor, and a memory coupled to the processor, wherein the memory includes a wrapped application, the wrapped application including a consolidated application wrapper that encloses application code, first wrapper logic and second wrapper logic, wherein the consolidated application wrapper manages operation of both the first wrapper logic and the second wrapper logic.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION OF EMBODIMENTS

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
FIG. 1 is a block diagram illustrating the packaging and installation of an application on a computing device.

FIG. 1 shows an example packaging flow for an application developed using the Android operating system and distributed in a package file, such as an Android Package File. An applicant project 10 includes various files needed to build an application, including source code, libraries, resources, and certificates. The source code is compiled into binary executable code that is packaged along with the associated resources and manifest into an application package 12.

An application is typically written in a high level programming language, such as Java. During compilation and packaging, the source code may be first compiled into a binary format and then converted into a format appropriate for the operating system on which the application is to be used. For example, for a Java application running on an Android platform, the source code is first compiled into class files in the Java bytecode format, which are then converted into the native ".dex" format of the Android operating system.

An application package, such as an Android Package in the ".apk" format, is then prepared including the binary program code in ".dex" files, along with associated resources and a manifest file. During installation onto a device 14, the operating system of the device 14 reads the manifest file and unpacks and installs the program code and associated resources from the .apk file on the device 14.

Figure 2:
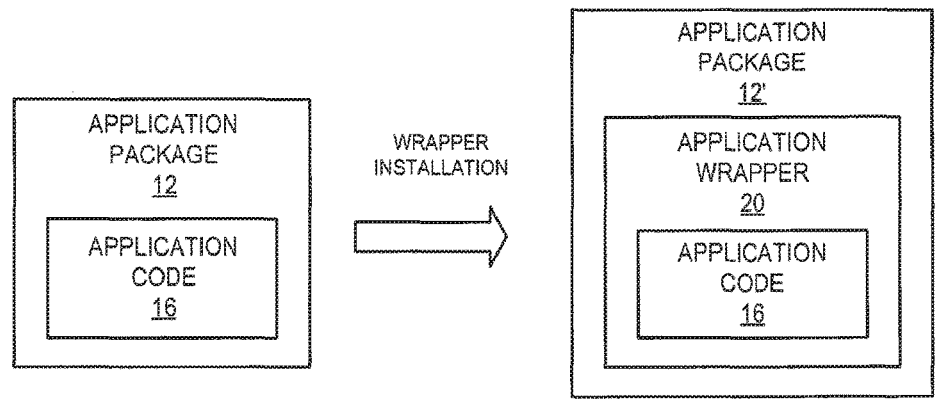
FIG. 2 is a block diagram illustrating installation of an application wrapper on an application.

Installation of an application wrapper is illustrated in FIG. 2. As shown therein, before wrapping, an application package 12 includes application code 16. The application wrapper 20 is installed "around" the application code 16 in the modified application package 12'. When the application is installed on a device, the operating system installs the application code wrapped by the application wrapper onto the device. The modified application package 12' includes the original application code 16 along with the application wrapper 20.

Figure 3:
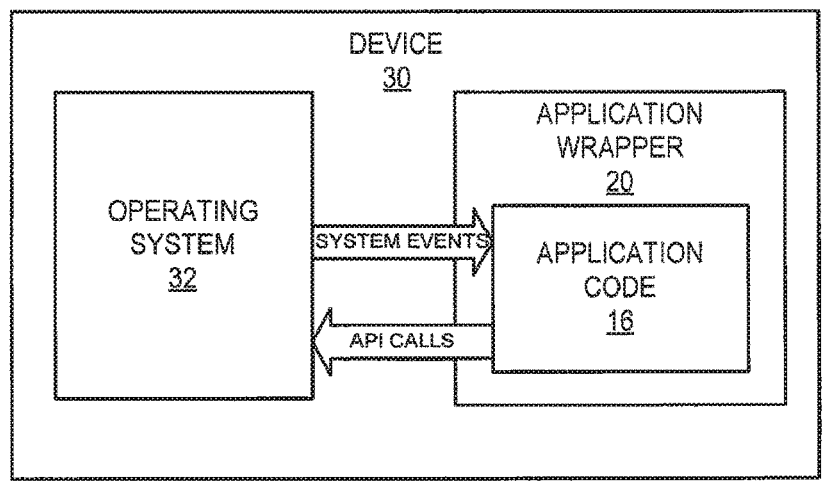
FIGS. 3 and 4 are block diagrams illustrating operation of an application wrapper on an application.

FIG. 3 illustrates the operation of a wrapped application that has been installed on a device 30 including an operating system 32. The operating system 32 notifies the application code 16 of system events associated with the application. A system event is an action of the system that must be handled by the program, such as "OnStart", "OnStop", etc. System events are processed by a listener function in the application code 16. When an application wrapper 20 is installed, however, the application wrapper 20 may intercept system events and determine if an action should be taken in response to the system event. For example, the application wrapper 20 may record the system event, generate a notification in response to the system event, etc.

The logic of the application wrapper 20 may also determine whether or not the system event should be passed along to the application code. Accordingly, the application wrapper 20 may implement logic that listens for system events provided to the application code 16. Note that the listener function of the application code 16 may be left in place to processes system events that are passed through to the application code 16 by the application wrapper 20.

The application wrapper 20 may also intercept application programming interface (API) calls made by the application code 16 to the operating system 32. The application code 16 issues an API call to request services from the operating system 32. For example, an API call may be used to turn on a camera, to read data from storage, to display an image on a screen, or to invoke any other functionality provided by the operating system 32.

The application wrapper 20 may pass the API call along to the operating system 32. Before the API call is passed to the operating system 32, the logic of the application wrapper 20 determines if any action needs to be taken in response to the API call and may also determine whether or not to pass the API call along to the operating system 32.

In general, the application wrapper 20 comprises executable code that monitors and/or controls behavior of the application program by intercepting one or more API calls by the application program, executes monitoring and/or control code in response to the API call, and thereafter returns control to the application program and/or passes the API call to the operating system 32 for processing.

For example, in case the application wrapper 20 is designed to limit access to a feature or resource on the device 30 during a designate time frame the application wrapper 20 may intercept an API call from the application code 16 that invokes the feature and, if the API call is made outside the designated time frame, generate and return an error code to the application code 16 instead of passing the API call on to the operating system 32.

Figure 4:
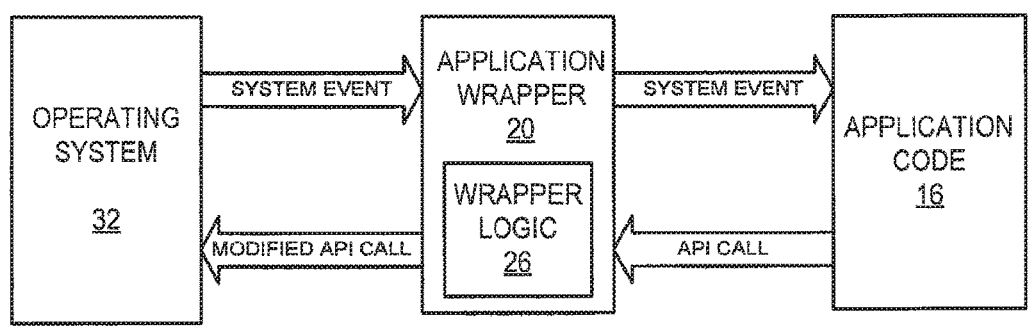

FIG. 4 illustrates the relationship between the operating system 32, the application wrapper 20 and the application code 16 in more detail. In particular, the application wrapper 20 includes wrapper logic 26 that determines how intercepted system events and API calls are processed by the application wrapper 20.

As shown in FIG. 4, the application wrapper sits between the operating system 32 and the application code 16 and filters system events and API calls passing between the operating system 32 and the application code 16. When a system event is generated and sent to the application code 16 by the operating system 20, a first listener function in the application wrapper 20 intercepts the system event and passes it to the wrapper logic 26. The wrapper logic 26 determines how to respond to the system event and whether or not to pass the system event along to the application code 16.

A second listener function in the application wrapper 20 listens for API calls from the application code 16, and passes the API calls to the wrapper logic 26. The wrapper logic 26 determines how to respond to the API call, whether to modify the API call, and whether or not to pass the API call or the modified API call along to the operating system 32.

For example, assume that the application code issues a system log API call to log an event that occurred during operation of the application program to a system log. The wrapper logic 26 may determine that the event should be logged to a separate event log, and may modify the API call to log the event to the separate event log rather than to the system log.

It will be appreciated that many different types of wrapping/instrumentation tools are offered by various vendors. For example, application monitoring tools are available, such as Flurry, Calif. Mobile Application Analytics, Tealeaf and Cassandra. Testing tools, such as IBM Rational Test Workbench Mobile, MonkeyTalk, Jamo, SeeTest and Squish are also available, while management applications are also available, such as CA Mobile Application Management, AirWatch, MobileIron and Fibrelink. In some cases, it is desirable to apply two different wrapping applications to a single application program so that, for example, the application can be both monitored and managed simultaneously.

Figure 5:
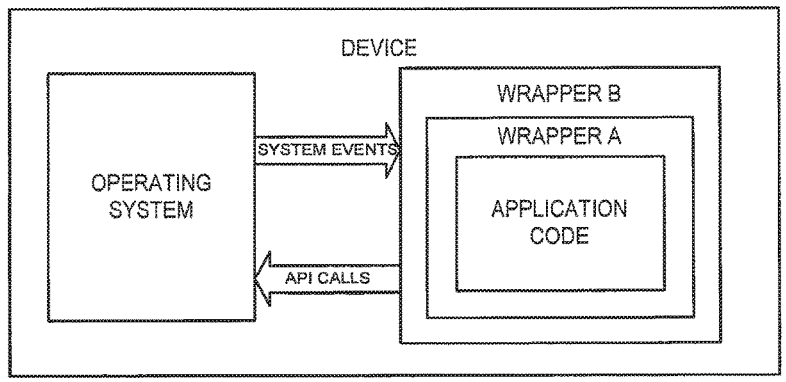
FIGS. 5 and 6 are block diagrams illustrating operation of an application that includes multiple application wrappers.

FIG. 5 illustrates an example of an application that has been wrapped by multiple wrapping applications. In particular, application code 16 has been wrapped by Wrapper A and Wrapper B. In the example illustrated in FIG. 5, Wrapper A was applied before Wrapper B; thus, Wrapper B envelopes the application code 16 that has already been wrapped by Wrapper A. System events generated by the operating system 32 must therefore be processed first by Wrapper B, then by Wrapper A, and then by the application code 16. Conversely, API calls generated by the application code 16 would be processed first by Wrapper A, then by Wrapper B before being transmitted to the operating system 32.

Figure 6:
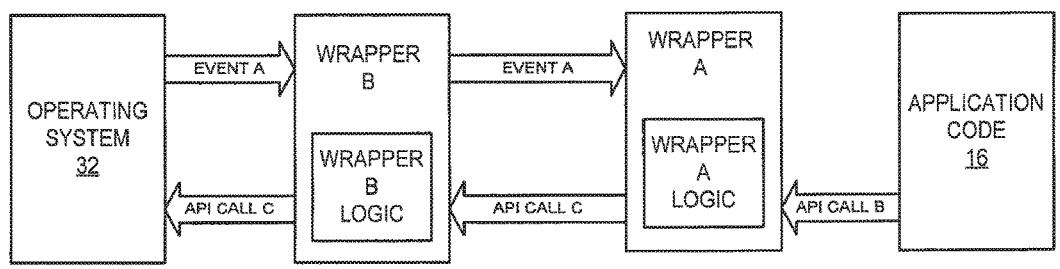

A problem can arise when an application is wrapped in this manner however, especially if the second wrapper is applied without knowledge that the first wrapper is in place. This problem is illustrated in FIG. 6, which shows an example of the passing of events and API calls between an operating system 32, a second wrapper (Wrapper B including Wrapper B logic), a first wrapper (Wrapper A including Wrapper A logic) and an application code 16.

One problem that can arise is that the first and second wrappers may handle system events and API calls inconsistently. For example, Wrapper A may be configured to pass a first system event (Event A) along to the application code, while Wrapper B may be configured to block the system event so that it is not received by the application code. This may or may not present a problem unless the Wrapper B logic expects the system event to be acted upon by the application code.

Similarly, Wrapper A logic may be configured to modify a first API call (API call B) and send a different API call (API call C) to the operating system. However, Wrapper B may also be configured to detect API call B and take a designated action in response to API call B. In the scenario shown in FIG. 6, Wrapper B would receive API call C and pass it through to the operating system 32. Wrapper B would not know that the application had issued API call B, and therefore would not take the desired action in response to API call B.

Another problem that can arise is that when the second wrapper (Wrapper B) is applied, the developer or tool that installs the second wrapper may not be aware of the presence of the first wrapper. When the second wrapper is installed, it may unintentionally replace API calls issued by the first wrapper with its own API calls. In this manner, the installation of the second wrapper may unintentionally alter the operation of the first wrapper.

These and similar scenarios can lead to unexpected operation of the application code 16 or either of the installed wrappers, for example by not taking an appropriate action in response to an event or API call.

Figure 7:
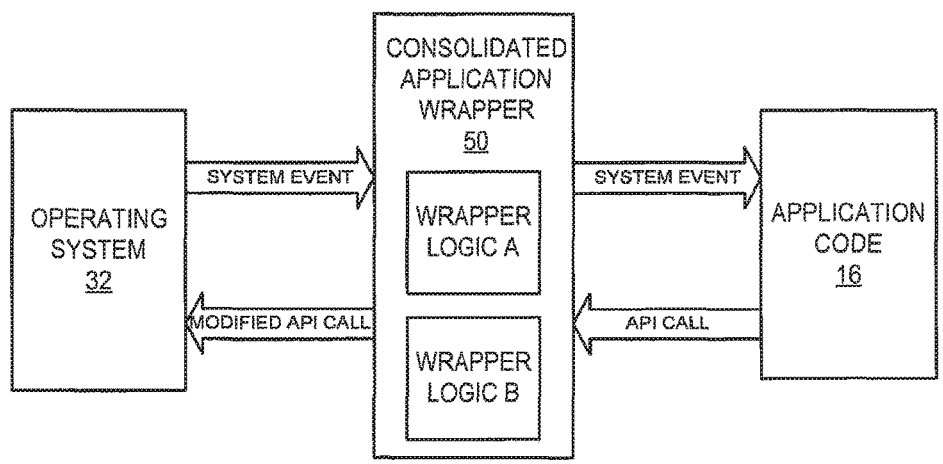
FIG. 7 is a block diagram illustrating an application that includes a consolidated application wrapper according to some embodiments.

FIG. 7 illustrates a consolidated application wrapper 50 according to some embodiments of the present inventive concepts. The consolidated application wrapper 50 includes wrapper logic from multiple different application wrappers, illustrated in FIG. 7 as Wrapper Logic A and Wrapper Logic B. The consolidated application wrapper 50 receives events from the operating system 32 and API calls from the application code 16 and passes the events and API calls to Wrapper Logic A and Wrapper Logic B, so that both Wrapper Logic A and Wrapper Logic B can take appropriate actions in response to the events and calls.

The consolidated application wrapper 50 may resolve conflicts among the included wrapper logic to ensure proper operation of the application code 16. Resolving conflicts among wrapper logic may be performed in a number of ways. For example, by assigning relative priorities to the application wrappers, so that if there is a conflict, the application code will be modified according to the application wrapper with the highest priority. Alternatively, a most recently applied wrapper logic may be given precedence.

In one scenario, if one wrapper logic wants to block an API call but another one wants to modify it, the consolidated application wrapper may bring into effect the most recent wrapper logic on the application. In any case, such scenarios may be very rare and easily customizable. For example, if an application management solution is blocking access to a data network (e.g., the Internet), and a monitoring solution wants to upload monitored data to a server backend, then the consolidated application wrapper can temporarily store the collected data on the local device memory and upload it whenever network becomes available. Also, if the user has control to alter the policy for an application management solution, then the user can change the policy to allow network access, in which case the conflict is resolved. However, if the user does not have any control over the previous wrapper, then the most recent wrapper logic may be applied. To the maximum extent possible, a consolidated application wrapper may try not to overwrite, but to complement, previously existing wrapper logic. In cases when overwriting cannot be avoided, then the most recent wrapper logic may replace any pre-existing wrapper logic.

Figure 8:
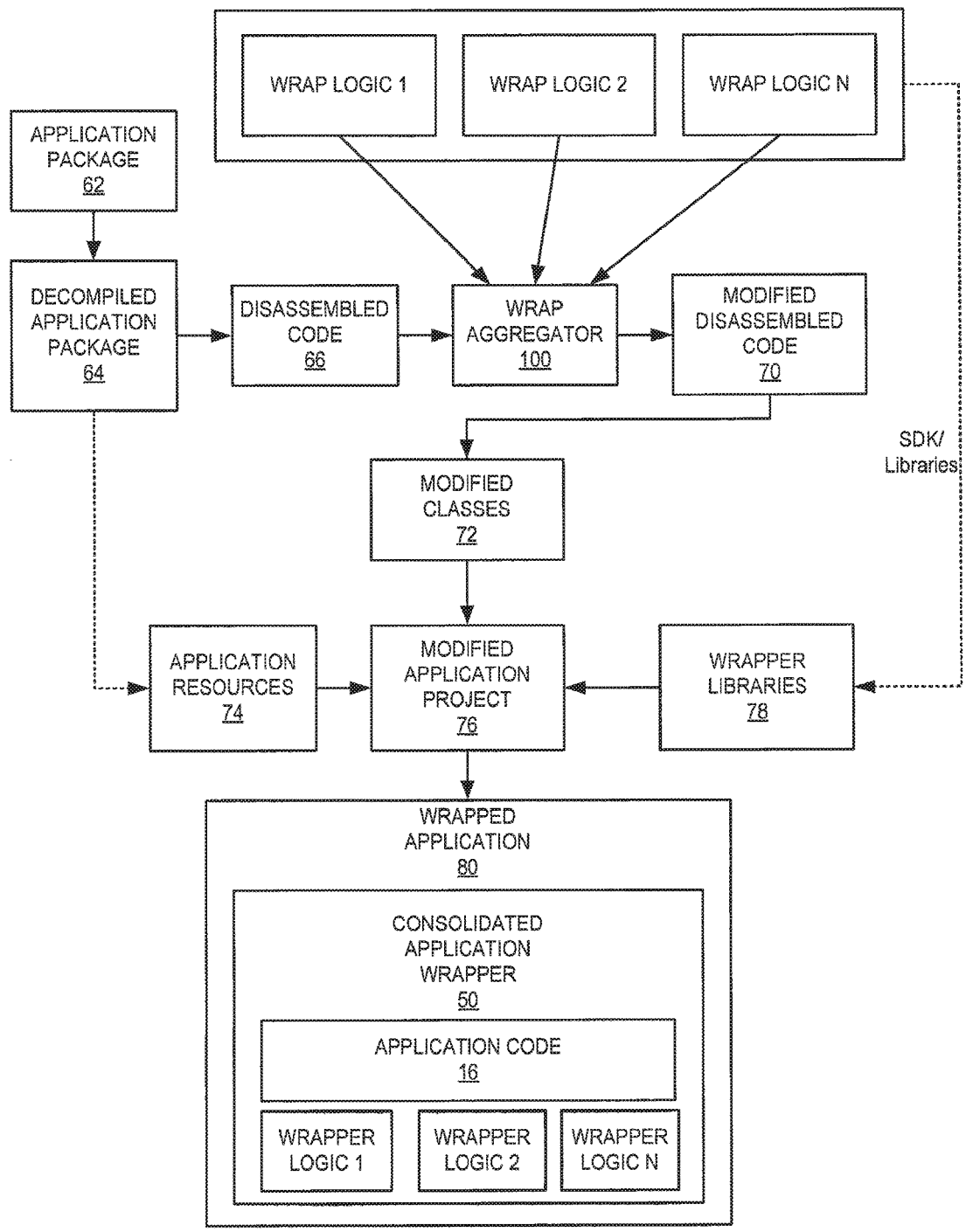
FIGS. 8 and 9 are block diagrams illustrating the generation and installation of consolidated application wrappers according to some embodiments.
Figure 9:
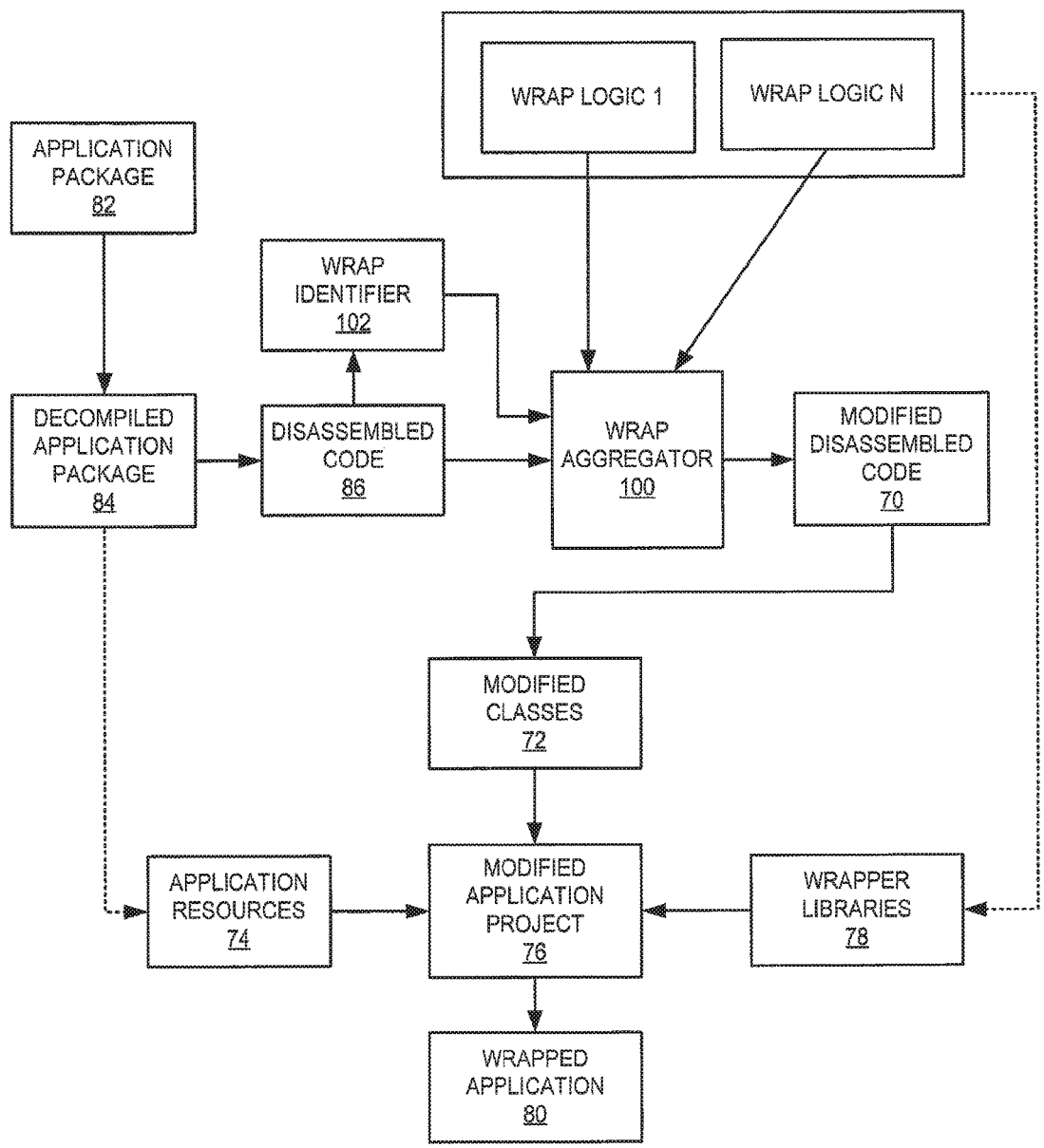

FIGS. 8 and 9 are block diagrams that illustrate operations associated with wrapping an application with multiple application wrappers in accordance with some embodiments. In particular, FIG. 8 illustrates operations associated with wrapping an application with multiple application wrappers when the original application is not already wrapped with a pre-existing wrapper application, and FIG. 9 illustrates operations associated with wrapping an application with multiple application wrappers when the original application is already wrapped with a pre-existing wrapper application.

Referring to FIG. 8, an application package 62 may be decompiled using a decompilation tool, such as apktool to provide a decompiled application package 64. The decompiled application package 64 may include an XML format manifest, a set of application resources 74 and a binary source code file in .dex format. For a Java application written for the Android operating system, the source code may include Java classes compiled to Dalvik VM bytecode. The binary source code of the application may be extracted from the decompiled application package 64, and an assembler for .dex files, such as smali, may be used to disassemble the binary source code to .smali format. The result is that disassembled source code 66 is obtained.

The disassembled source code is provided to a wrap aggregator 100, which also receives wrap logic (e.g., Wrap Logic 1, Wrap Logic 2, etc.) from two or more application wrapper programs.

The wrap aggregator 100 analyzes the code from the wrap logic to determine what modifications need to be made to the application source code to accommodate the wrap logic from each of the application wrappers. That is, the wrap aggregator 100 receives code from each of the wrapping applications and determines what hooks need to be added to the application source code to enable the wrapping applications to intercept particular events and API calls. The wrap aggregator 100 then inserts necessary hooks into the application source code that enable the consolidated application wrapper to intercept the events and API calls and pass them on to the wrapping logic for processing as needed.

SDK libraries included as part of the wrapping applications are extracted from the wrapping applications and stored in wrapper libraries 78 for later use.

The output of the wrap aggregator is modified disassembled source code 70 in the .smali format. The modified disassembled code is then assembled with the use of a tool, such as baksmali to provide modified classes 72 in the .dex format. The modified classes 72 are then combined together with the application resources 74 extracted from the decompiled application package 64 and the wrapper libraries 78 supplied with the wrapper applications to form a modified application project 76. The modified application project is then compiled in a build process to form the wrapped application 80 that is ready to be installed on a target system.

The resulting wrapped application 80 includes a consolidated application wrapper 50 including wrapper logic 1, 2, ..., N along with the application code 16.

FIG. 9 illustrates operations associated with wrapping an application with multiple application wrappers when the original application is already wrapped with a pre-existing wrapper application.

Referring to FIG. 9, an application package 82 that includes a pre-existing application wrapper is decompiled to provide a decompiled application package 84. The binary source code of the application is extracted from the decompiled application package 84, and an assembler is used to disassemble the binary source code to provide disassembled source code 86.

The disassembled source code 86 is provided to both a wrap aggregator 100 and a wrap identifier 102.

The wrap identifier 102 checks the disassembled code for any pre-existing wrapper components. To assist this process, some information about the pre-existing wrapper components maybe provided to the wrap identifier as user input, such as SDK libraries, code parse/modification/injection modules, etc. This information facilitates the processes of determining whether the application is pre-wrapped. A sampel code parse/modification XML snippet is as follows:

```
<classReplacement id="DeviceFeature Camera">
<from>Landroid/hardware/Camera;->open(I)Landroid/hardware/Camera;</from>
<to>Lcom/ca/android/hardware/CACamera;->open(I)Landroid/hardware/Camera;</to>
</classReplacement>
```

This code indicates that a wrapper application has replaced an API Call to open the camera application ("Camera") on an android phone with a replacement call to specific device handler ("CACamera"). Another example XML snippet is:

```
<classReplacement id="DeviceFeature GCM">
<skipfile>com/google/android/gms/gcm/GoogleCloudMessaging$1</skipfile>
<from>Lcom/google/android/gms/gcm/GoogleCloudMessaging;</from>
<to> Lcom/ca/android/gms/gcm/CAGoogleCloudMessaging;</to>
</classReplacement>
```

This code indicates that a wrapper application has replaced a call to GoogleCloudMessaging with a call to a different application, namely, CAGoogleCloudMessaging.

The wrap aggregator receives information about the existing wrap logic from the wrap identifier 102 and receives the new wrap logic (e.g., Wrap Logic 1, Wrap logic N etc.) from two or more application wrapper programs.

The wrap aggregator 100 analyzes the code from the wrap logic to determine what modifications need to be made to the application source code to accommodate the wrap logic from each of the application wrappers. The wrap aggregator 100 then inserts necessary hooks into the application source code that enable the consolidated application wrapper to intercept the events and API calls and pass them on to the wrapping logic, including the new wrapping logic and the existing wrapping logic, for processing as needed.

As in the embodiments of FIG. 8, the output of the wrap aggregator is modified disassembled source code 70 that is assembled to provide modified classes 72. The modified classes 72 are then combined together with the application resources 74 extracted from the decompiled application package 64 and wrapper libraries 78 supplied with the wrapper applications to form a modified application project 76. The modified application project is then compiled in a build process to form the wrapped application 80 that is ready to be installed on a target system.

The resulting wrapped application 80 includes a consolidated application wrapper 50 including both the new wrapper logic and the pre-existing wrapper logic along with the application code 16.

Figure 10:
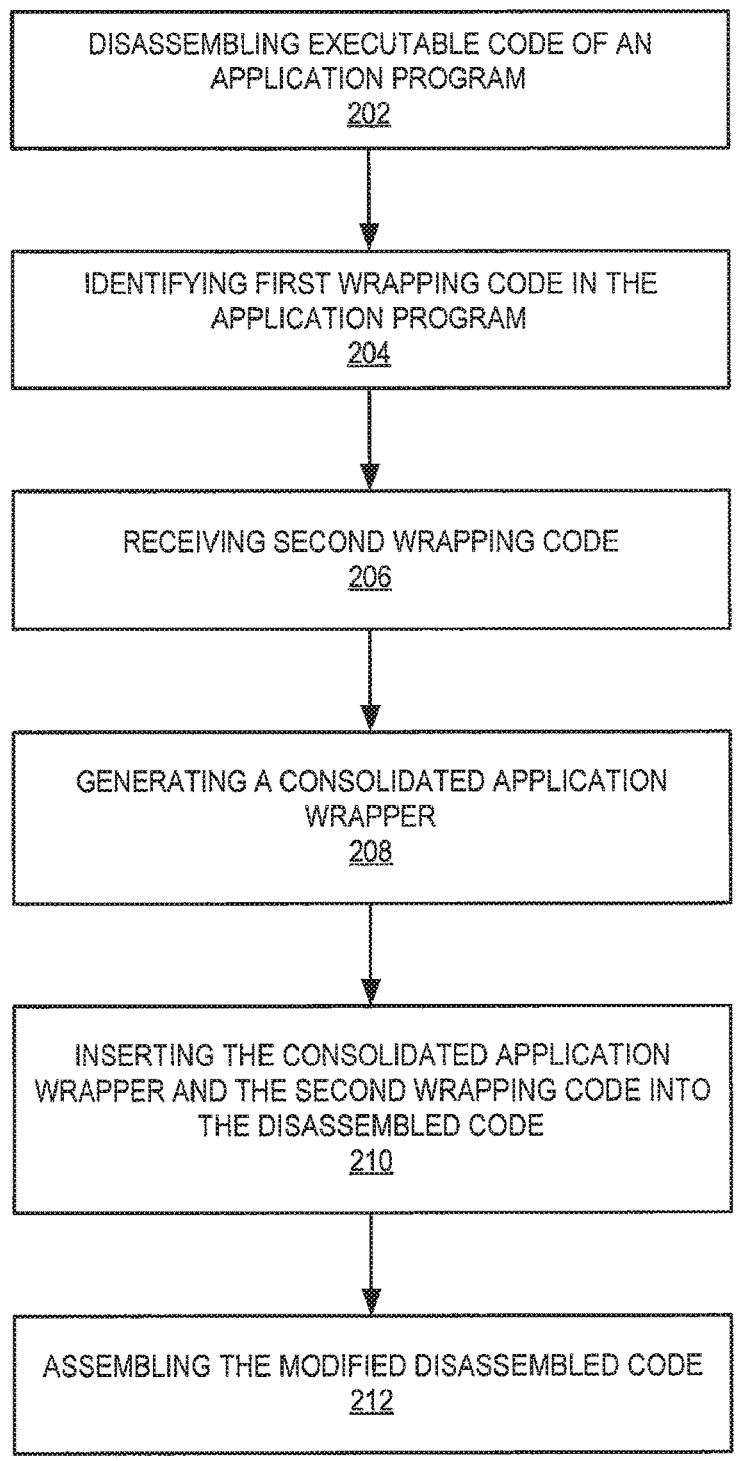
FIGS. 10 and 11 are flowcharts illustrating operations associated with the generation of consolidated application wrappers according to some embodiments.
Figure 11:
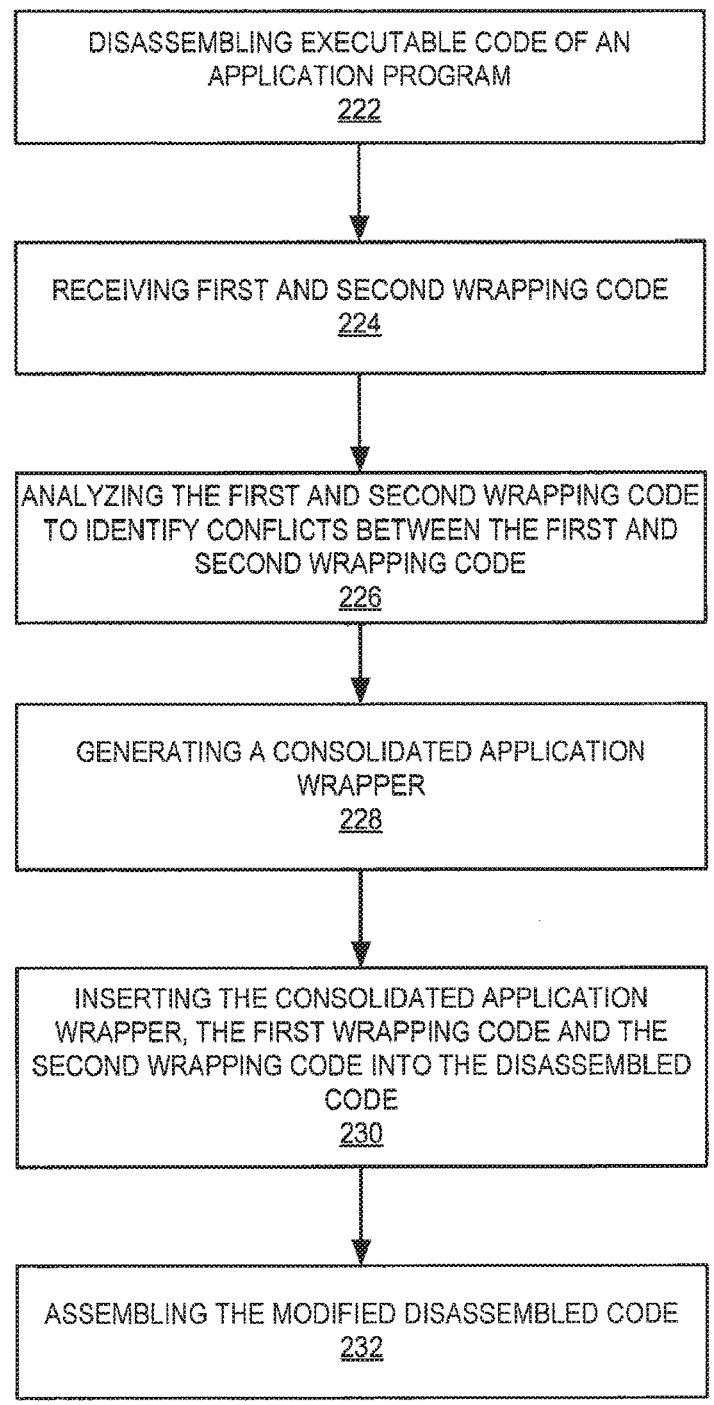

Operations according to some embodiments are illustrated in FIGS. 10 and 11. For example, referring to FIG. 10, operations according to some embodiments include disassembling the executable code of an application program (block 202). The executable code of the application program may have been previously decompiled from an application package containing the application program. The application package may also include such other items as resources, libraries, a manifest, etc.

The operations further include identifying pre-existing first wrapping code that is included in the application code (block 204). The pre-existing wrapping code may be identified with the aid of user input regarding the existence of the pre-existing application code, such as the names of libraries, modules, etc., associated with the pre-existing wrapping code. Second wrapping code that is to be applied to the application program is received (block 206). A consolidated application wrapper is then generated (block 208) that enables coexistence of the first and second wrapping code. The consolidated application wrapper may be generated by analyzing the operation of the first wrapping code and the second wrapping code to identify any potential conflicts in the first and second wrapping code, and generating harmonization code that manages the operation of both the first wrapping code and the second wrapping code. For example, the operations may include determining what API calls and/or system events are processed by each of the first and second wrapping code, and if the first and second wrapping code both process the same API call or system event, providing code that calls both the first and second wrapping code in the event the consolidated application wrapper receives the API call or system event.

The operations then include inserting the consolidated application wrapper and the second wrapping code into the disassembled code to provide modified (wrapped) disassembled code (block 210), and assembling the modified disassembled (block 212).

Referring to FIG. 11, operations according to further embodiments include disassembling the executable code of an application program (block 222) and receiving first and second wrapping code that is to be applied to the application program (block 224). The first and second wrapping code is analyzed to identify potential conflicts between the first and second wrapping code (block 226), and a consolidated application wrapper is generated as described above that enables coexistence of the first and second wrapping code (block 228). The operations then include inserting the consolidated application wrapper, the first wrapping code and the second wrapping code into the disassembled code to provide modified (wrapped) disassembled code (block 230), and assembling the modified disassembled (block 232).

Figure 12:
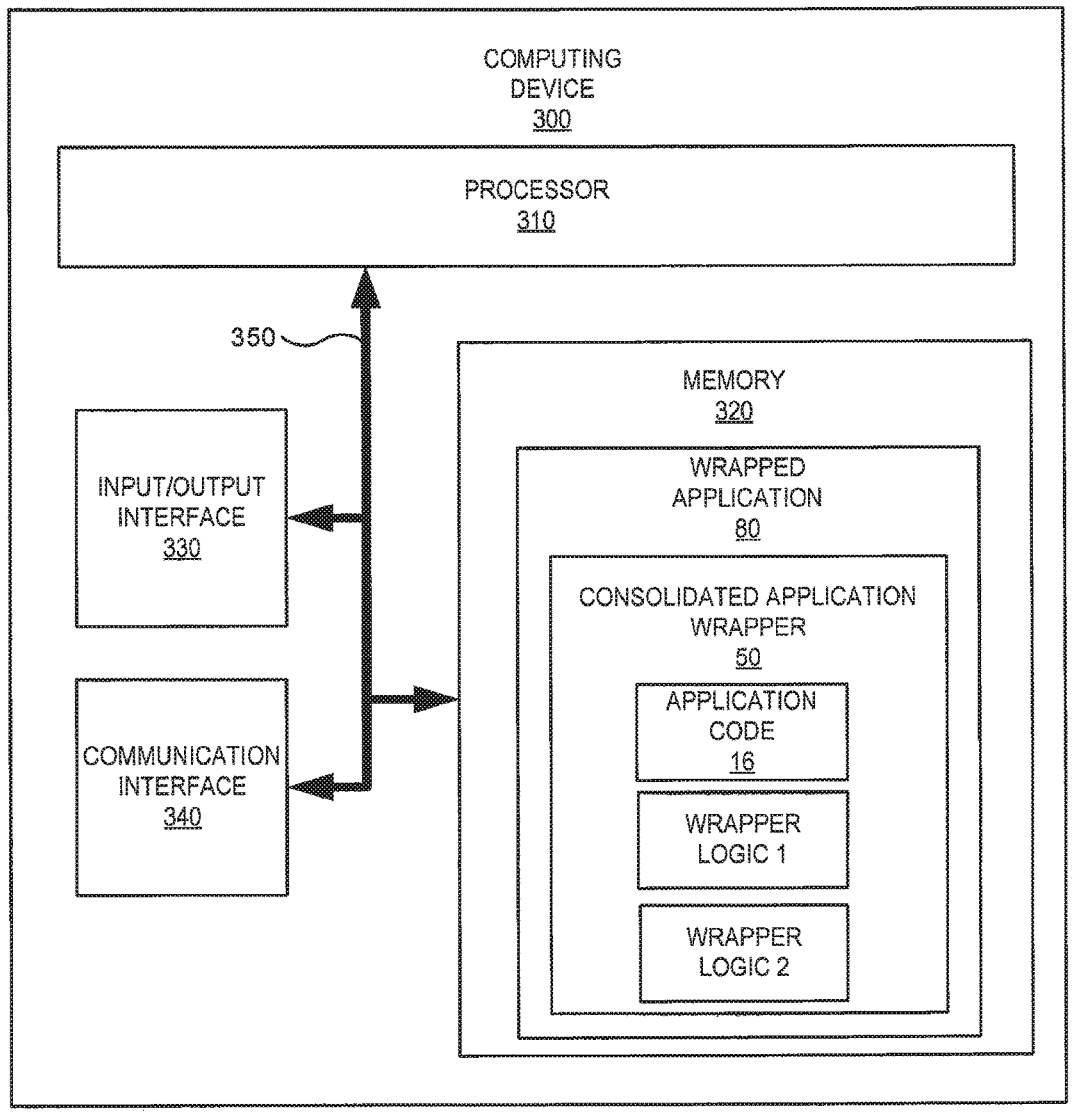
FIG. 12 is a block diagram of a computing device on which a consolidated application wrapper according to some embodiments is installed.

FIG. 12 illustrates a computing device 300, such as a mobile computing device, on which a wrapped application including a consolidated application wrapper is installed. The computing device 300 includes a processor 310, such as a microprocessor, microcontroller, etc., that controls operation of the device 300. The processor 310 communicates with a memory 320, an input/output interface 330 and a communication interface 340 via a system bus 350. A wrapped application 80 is installed in the memory 320 of the computing device 300. The wrapped application 80 includes a consolidated application wrapper 50 that encloses the application code 16 of the application along with wrapper logic of at least two application wrappers, e.g., Wrapper Logic 1 and Wrapper Logic 2. The consolidated application wrapper 50 enables coexistence of both Wrapper Logic 1 and Wrapper Logic 2 in a manner that does not cause them to interfere with each other.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer program product, comprising:
a non-transitory computer readable storage medium storing computer readable program code which when executed by a processor of an electronic device causes the processor to perform operations comprising:
disassembling executable code of an application program to provide disassembled code;
identifying first wrapping code in the disassembled code;
receiving second wrapping code;
assigning relative priorities to the first and second wrapping code;
generating a consolidated application wrapper that manages operation of both the first wrapping code and the second wrapping code;
inserting the second wrapping code and the consolidated application wrapper into the disassembled code to form modified disassembled code; and
assembling the modified disassembled code to form modified executable code;
wherein inserting the second wrapping code into the disassembled code comprises identifying a conflict between the first wrapping code and the second wrapping code and inserting aggregating code into the disassembled code that modifies the disassembled code to invoke one of the first wrapping code and the second wrapping code having a highest relative priority in event of the conflict.

2. The computer program product of claim 1, wherein identifying the conflict between the first wrapping code and the second wrapping code comprises determining that the first wrapping code and the second wrapping code are configured to intercept a first application programming interface call by the disassembled code, and wherein the aggregating code intercepts the first application programming interface call by the disassembled code and responsively calls the one of the first wrapping code and the second wrapping code having the highest relative priority.

3. The computer program product of claim 1, wherein the operations further comprise:
decompiling the executable code before disassembling the executable code, wherein decompiling the executable code comprises extracting bytecode from the executable code and extracting application resources from the executable code.

4. The computer program product of claim 3, wherein the operations further comprise:
converting the modified executable code into modified bytecode.

5. The computer program product of claim 4, wherein the operations further comprise:
compiling a modified application using the modified bytecode and the application resources.

6. The computer program product of claim 5, wherein compiling the modified application comprises compiling the modified application using a software library associated with the second wrapping code.

7. The computer program product of claim 1, wherein the first and second wrapping code comprise executable code that monitors and/or controls behavior of the application program by intercepting one or more application programming interface calls by the application program, executing monitoring and/or control code in response to the application programming interface call, and thereafter returning control to the application program.

8. The computer program product of claim 1, wherein identifying first wrapping code in the disassembled code comprises receiving information about a software library associated with the first wrapping code and analyzing the disassembled code to determine where in the disassembled code the software library is referenced.

9. A computer program product, comprising:
a non-transitory computer readable storage medium storing computer readable program code which when executed by a processor of an electronic device causes the processor to perform operations comprising:
disassembling executable code of an application program to provide disassembled code;
receiving first and second wrapping code;
analyzing the first and second wrapping code to identify conflicts between the first and second wrapping code;
assigning relative priorities to the first and second wrapping code;
automatically generating a consolidated application wrapper that enables the first and second wrapping code to coexist without conflict in the application program based on the relative priorities of the first and second wrapping code;

inserting the first and second wrapping code and the consolidated application wrapper into the disassembled code to form modified disassembled code; and assembling the modified disassembled code to form modified executable code.

10. The computer program product of claim 9, wherein the first wrapping code and the second wrapping code are configured to intercept a first application programming interface call by the disassembled code, and wherein the consolidated application wrapper intercepts the first application programming interface call by the disassembled code and responsively calls the one of the first wrapping code and the second wrapping code having the highest relative priority.

11. The computer program product of claim 9, wherein the operations further comprise:

decompiling the executable code before disassembling the executable code, wherein decompiling the executable code comprises extracting bytecode from the executable code and extracting application resources from the executable code.

12. The computer program product of claim 9, wherein the first wrapping code and the second wrapping code comprise executable code that monitors and/or controls behavior of the application program by intercepting one or more application programming interface calls by the application program, executing monitoring and/or control code in response to the application programming interface call, and thereafter returning control to the application program.

13. The computer program product of claim 9, wherein the first wrapping code, the second wrapping code and the consolidated application wrapper are inserted into the disassembled code without altering operation of the first wrapping code or the second wrapping code.

* * * * *